United States Patent
Zwaneveld et al.

(10) Patent No.: US 12,084,118 B2
(45) Date of Patent: Sep. 10, 2024

(54) ASSEMBLY OF A FIRST AND SECOND PANEL

(71) Applicant: PONDUS R&D BV, Deurne (NL)

(72) Inventors: Luit Cornelis Zwaneveld, Deurne (NL); Bob Henri Maria Jan Fleuren, Deurne (NL)

(73) Assignee: EBUSCO B.V., Deurne (NL)

( * ) Notice: Subject to any disclaimer, the term of this patent is extended or adjusted under 35 U.S.C. 154(b) by 498 days.

(21) Appl. No.: 17/432,620

(22) PCT Filed: Feb. 17, 2020

(86) PCT No.: PCT/EP2020/054072
§ 371 (c)(1),
(2) Date: Aug. 20, 2021

(87) PCT Pub. No.: WO2020/169519
PCT Pub. Date: Aug. 27, 2020

(65) Prior Publication Data
US 2022/0135142 A1    May 5, 2022

(30) Foreign Application Priority Data
Feb. 21, 2019 (EP) .................... 19158663

(51) Int. Cl.
*B62D 27/02* (2006.01)
*B62D 25/20* (2006.01)
(Continued)

(52) U.S. Cl.
CPC ....... *B62D 27/026* (2013.01); *B62D 25/2036* (2013.01); *B62D 31/02* (2013.01); *F16B 11/006* (2013.01)

(58) Field of Classification Search
CPC .. B62D 27/026; B62D 25/2036; B62D 31/02; B62D 31/025; F16B 11/006
See application file for complete search history.

(56) References Cited

U.S. PATENT DOCUMENTS 6,447,631 B1    9/2002 Schaehl et al.
7,004,536 B2 *  2/2006 Wieber .................. B62D 25/06
                                                  296/210
(Continued)

FOREIGN PATENT DOCUMENTS

| EP | 2 749 481 | 7/2014 |
| WO | 2009/125291 | 10/2009 |

OTHER PUBLICATIONS

International Search Report for PCT/EP2020/054072 mailed May 13, 2020, 4 pages.
(Continued)

*Primary Examiner* — Jason S Morrow
(74) *Attorney, Agent, or Firm* — NIXON & VANDERHYE P.C.

(57) ABSTRACT

There is provided an assembly of a first panel (1) and a second panel (2), wherein a head end surface (12) of the first panel is connected to a side surface (22) of the second panel, the assembly having an L-shape or T-shape when seen in a cross sectional view. The panels are bonded using at least a first adhesive (4) having a first elastic modulus ($\lambda 1$) and a second adhesive (5) having a second elastic modulus ($\lambda 2$) that is lower than the first elastic modulus ($\lambda 1$). The first adhesive bonds the panels in a first region, and the second adhesive bonds the panels in a second region, wherein the second region is arranged next to the first region, when seen in the cross sectional view.

15 Claims, 7 Drawing Sheets

(51) Int. Cl.
    *B62D 31/02*     (2006.01)
    *F16B 11/00*     (2006.01)

(56) References Cited

U.S. PATENT DOCUMENTS

| | | | |
|---|---|---|---|
| 10,065,684 B2* | 9/2018 | Hofer | B62D 25/06 |
| 11,230,325 B2* | 1/2022 | Quaderer | B62D 29/045 |
| 11,286,007 B2* | 3/2022 | Champagne | B62D 27/023 |
| 11,753,084 B2* | 9/2023 | Oda | B62D 25/025 |
| | | | 296/193.01 |
| 2009/0081400 A1 | 3/2009 | Wolf et al. | |
| 2014/0212637 A1* | 7/2014 | Syvret | B32B 7/12 |
| | | | 156/60 |
| 2017/0106583 A1* | 4/2017 | Schönberger | B29C 35/02 |

OTHER PUBLICATIONS

Written Opinion of the ISA for PCT/EP2020/054072 mailed May 13, 2020, 5 pages.

\* cited by examiner

ASSEMBLY OF A FIRST AND SECOND PANEL

This application is the U.S. national phase of International Application No. PCT/EP2020/054072 filed Feb. 17, 2020 which designated the U.S. and claims priority to EP Patent Application No. 19158663.5 filed Feb. 21, 2019, the entire contents of each of which are hereby incorporated by reference.

FIELD OF THE INVENTION

The invention relates to an assembly of a first panel and a second panel. The invention also relates to a vehicle body comprising such an assembly. It further relates so a method of connecting a first panel and a second panel.

BACKGROUND ART

A transit bus, or other types of high occupancy vehicles, may have a body composed of a metal such as aluminum or steel, or alloys such as a magnesium alloy.

In order to make such vehicles light weight, one or more composite materials may be used in the vehicle body. A composite material is a lightweight, non-metallic material.

It is known to form the high stress areas of the vehicle of a composite structure made from materials such as carbon fiber, balsa and/or structural foam core.

Publication US2013240278 (A1) discloses a high occupancy vehicle with a vehicle body comprising a first skin, a second skin, and a core between the skins. For example, the core may comprise a honeycomb structure, or may be constructed from balsa wood or foam, or may include a composite material that is or is not the same as the first or second skin materials. Other materials that may form various parts of the vehicle body may include aluminum, stainless steel, fiberglass, aramid, ultra-high molecular weight polyethylene, carbon fiber, or other known structural fibers, fiber reinforced plastics.

Because of their size, the bodies of high occupancy and heavy-duty vehicles are preferably not made out of one piece. Separate body parts, such as the floor and wall panels are manufactured separately after which they are assembled into one vehicle body. In most cases the separate panels are coupled by using coupling means such as bolts and nuts. Alternatively, especially when using composite materials, different panels may be bonded together. In order to join the panels structural these are bonded together using high stiffness adhesives.

SUMMARY OF THE INVENTION

Drawback of the known art is that even when using such high stiffness adhesives in assembling a vehicle body, failure of the joint or of the different panels itself cannot be avoided. This is mainly due to forces applied on the vehicle body during driving.

One of the objects of the invention is the assembly of two panels of a vehicle body using adhesive, wherein the risks of disengagement of panels is minimized or at least decreased.

A first aspect of the invention provides an assembly of a first panel and a second panel, wherein a head end surface of the first panel is connected to a side surface of the second panel. The assembly has an L-shape or T-shape when seen in a cross sectional view. The panels are bonded by using at least a first adhesive having a first elastic modulus and a second adhesive having a second elastic modulus that is lower than the first elastic modulus. The first adhesive bonds the panels in a first region, and the second adhesive bonds the panels in a second region, the second region being arranged next to the first region, when seen in the cross sectional view.

Since the second adhesive has an elastic modulus that is relatively low (i.e. lower than the first elastic modulus of the first adhesive), this second adhesive layer will decrease the risk of cleavage in the first adhesive (layer). The second layer strengthens the bond for rotational forces (around the Z-axis), while the first adhesive strengthens the bond in the transversal direction (X and Y-directions). In other words, the first adhesive provides for the shear stiffness, while the second adhesive avoids cleavage of the first adhesive and is acting as the peel resistant adhesive.

In an embodiment, the first and second panel form an L-shaped joint, wherein the second adhesive seals the first adhesive from an enclosed space that is bounded by the first and second panel.

In an embodiment, the first panel is a floor panel of a vehicle, and the second panel is a wall panel of the vehicle.

In an embodiment, the first panel and the second panel are shaped so as to create a region having a wedge shape in the cross sectional view which is at least partly filled with the second adhesive. This wedge enhances the flexibility and peel resistance of the second adhesive.

In an embodiment, the assembly comprises an extension arranged on the first panel to effectively increase the head end surface of the first panel, and wherein the second adhesive is arranged between the extension and the side surface of the second panel.

In an embodiment, the extension comprises an L-profile coupled to the first panel at a side surface of the first panel near the head end.

In an embodiment, the extension is flexible. By using a flexible extension, the (peel) resistance of the second adhesive is effectively enhanced due to the fact that the extension will bend slightly when forces are applied.

In an embodiment, the extension comprises metal with a stiffness between 70000 MPa and 210000 MPa.

In an embodiment, the first elastic modulus ($\lambda 1$) lies in a range between 500-2000 MPa.

In an embodiment, the second elastic modulus ($\lambda 2$) lies in a range between 5-20 MPa.

In an embodiment, the first adhesive comprises a two-component epoxy.

In an embodiment, the second adhesive comprises a silyl-modified polymer or polyurethane polymer.

According to a second aspect, there is provided a vehicle body comprising the assembly as described above.

The vehicle body may be a body for a high occupancy vehicle, such as a public transport bus.

According to a third aspect, there is provided a method of connecting a first panel and a second panel, the method comprising:
  providing at least part of a head end surface of the first panel with a first adhesive having a first elastic modulus ($\lambda 1$);
  placing the head end surface of the first panel onto a side surface of the second panel;
  inserting a second adhesive having a second elastic modulus ($\lambda 2$) between the head end surface of the first panel and the side surface of the second panel, wherein the second elastic modulus ($\lambda 2$) is lower than the first elastic modulus ($\lambda 1$).

BRIEF DESCRIPTION OF THE DRAWINGS

These and other aspects of the invention are apparent from and will be elucidated with reference to the embodiments described hereinafter. In the drawings, FIG. 1 schematically shows a cross section of an assembly according to an embodiment of the invention.

It should be noted that items which have the same reference numbers in different Figures, have the same structural features and the same functions. Where the function and/or structure of such an item has been explained, there is no necessity for repeated explanation thereof in the detailed description.

DETAILED DESCRIPTION OF EMBODIMENTS

An elastic modulus (also known as modulus of elasticity) is a quantity that measures an object or substance's resistance to being deformed elastically (i.e., non-permanently) when a stress is applied to it. The elastic modulus of an object is defined as the slope of its stress-strain curve in the elastic deformation region: A stiffer material will have a higher elastic modulus. An elastic modulus A has the form:

$$\lambda = stress/strain \tag{1}$$

where stress is the force causing the deformation divided by the area to which the force is applied and strain is the ratio of the change in some parameter caused by the deformation to the original value of the parameter. If stress is measured in Pascals, then since strain is a dimensionless quantity, the units of A will be Pascals as well.

Figure 1:
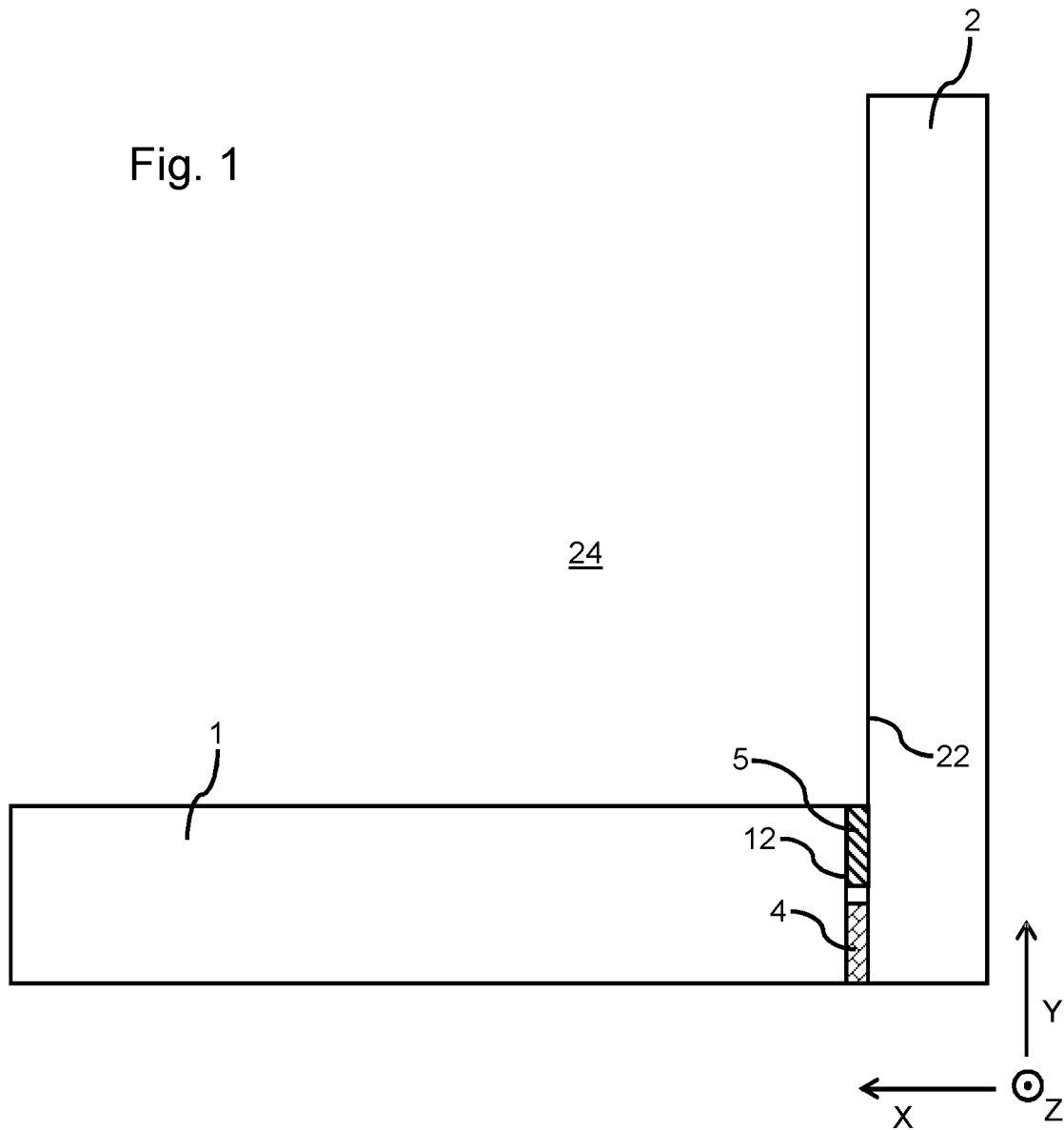

FIG. 1 schematically shows a cross section of an assembly according to an embodiment of the invention. The assembly comprises a first panel 1 bonded to a second panel 2. A head end 12 of the first panel 1 is connected to a side wall 22 of the second panel 2. In the cross sectional view of FIG. 1 the first panel 1 mainly extends in the X-direction, while the second panel 2 mainly extends in the Y-direction. Both panels 1, 2 also extend in the Z-direction which is perpendicular to the viewing plane.

In this embodiment, the assembly has an L-shape when seen in this cross sectional view. The panels 1, 2 are bonded by using at least a first adhesive 4 having a first elastic modulus ($\lambda 1$) and a second adhesive 5 having a second elastic modulus ($\lambda 2$) that is lower than the first elastic modulus ($\lambda 1$).

The panel 1 may be a floor panel of a vehicle body, while the second panel 2 may be a wall panel of the vehicle body. So in the following, the first panel 1 is referred to as the floor panel 1 and the second panel 2 is referred to as the wall panel 2.

It is noted that the shown thickness of the panels 1, 2 in FIG. 1 is deliberately drawn out of proportion, to be able to show more details at the connection region. It should be clear that in case of a vehicle body, the panels 1, 2 are much thinner. Typical values for the thickness of the floor panel 1 lie in a range between 5-15 cm, and for the thickness of the wall panel 2 lie in a range between 5-10 cm.

As can be seen from FIG. 1, the first adhesive 4 bonds the panels in a first region, and the second adhesive 5 bonds the panels in a second region, the second region being arranged next to the first region, when seen in the cross sectional view. In FIG. 1, the first panel 1 and second panel 2 form an L-shaped joint. The adhesives are provided in such a way that the second adhesive 5 seals the first adhesive from an enclosed space 24 that is bounded by the first panel 1 and second panel 2.

The first adhesive 4 may be used to bond the two panels 1, 2 all along their Z-dimension. So for example, if the panels have a length (i.e. a Z-dimension) of 10 meters, the first adhesive 4 may be applied all along the 10 meters. But depending on the application, the first adhesive 4 may be applied only at a part or parts of the length of the panels 1, 2. The same accounts for the second adhesive 5.

Figure 2:
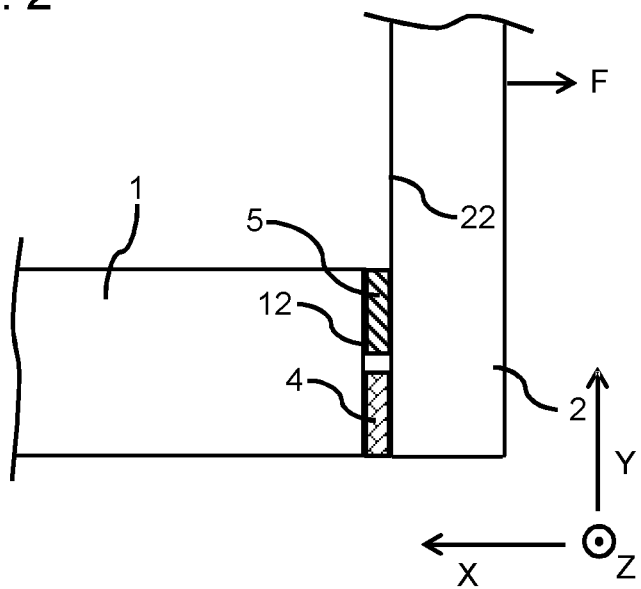
FIG. 2 shows a blown up detailed view of the assembly of FIG. 1.

FIG. 2 shows a blown up detailed view of the assembly of FIG. 1. FIG. 2 shows a situation wherein no or little lateral forces F are applied to the wall panel 2. Such lateral forces may result from driving on uneven road surfaces, side wind or other external forces.

Figure 3:
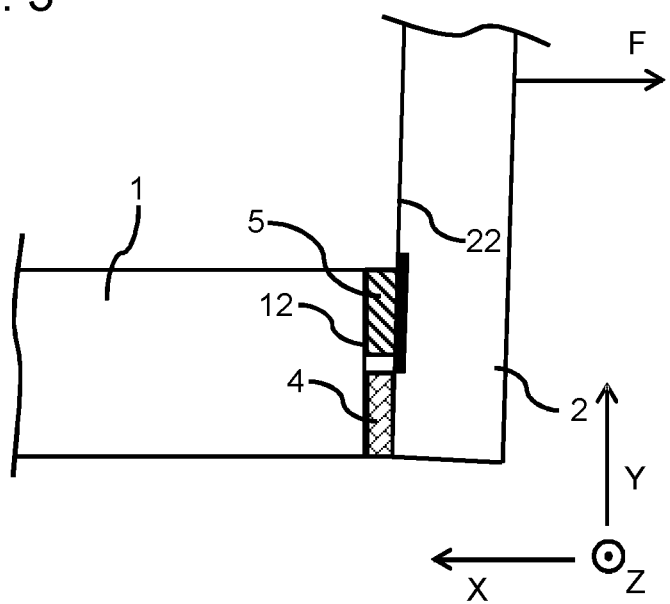
FIG. 3 shows a blown up detailed view of the assembly of FIG. 1.

FIG. 3 shows a blown up detailed view of the assembly of FIG. 1 in a situation wherein such lateral forces F are applied to the wall panel 2 that the wall panels tends to deviate from the rest position shown in FIG. 2. Without the presence of the second adhesive 5, the relatively stiff first adhesive 4 could be exposed to cleavage and/or peel, resulting in a failure of the connection between the panels 1 and 2.

Since the second adhesive 5 has an elastic modulus ($\lambda 2$) that is relatively low (i.e. lower than the first elastic modulus ($\lambda 1$) of the first adhesive 4), this second adhesive layer 5 will decrease the risk of cleavage in the first adhesive (layer) 4. The second layer 5 strengthens the bond for rotational forces (around the Z-axis), while the first adhesive strengthens the bond in the transversal direction (X and Y-directions). In other words, the first adhesive provides 4 for the shear stiffness, while the second adhesive 5 avoids cleavage of the first adhesive 4 and is acting as the peel resistant adhesive.

It is noted that the bond of the two panels 1, 2 of the embodiment shown in FIG. 1-3 contains a cavity in between the first adhesive 4 and second adhesive 5. This cavity is not essential but it is optional. An advantage of such a cavity is that the two adhesives are not in direct contact. The cavity may avoid a mutual negative influence of the adhesive like one adhesive softening, hardening or degrading the other.

Figure 4:
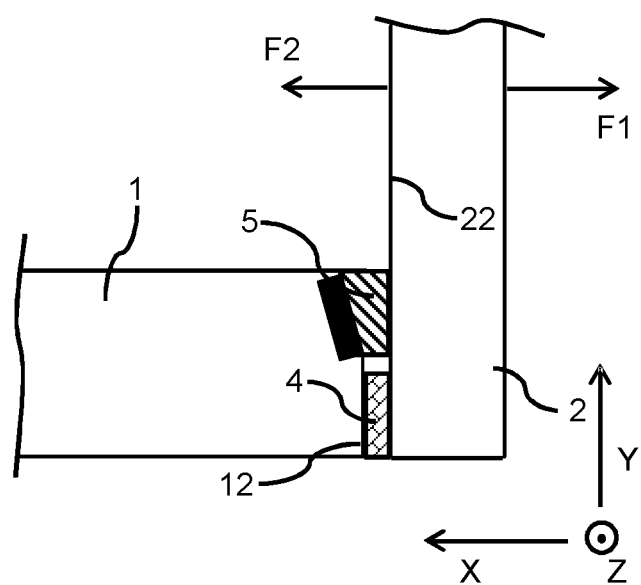
FIG. 4 schematically shows a cross section of an assembly according to another embodiment of the invention.

FIG. 4 schematically shows a cross section of an assembly according to another embodiment of the invention. The assembly comprises a first panel 1 bonded to a second panel 2. A head end 12 of the first panel 1 is connected to a side wall 22 of the second panel 2. In the cross sectional view of FIG. 4 the first panel 1 mainly extends in the X-direction, while the second panel 2 mainly extends in the Y-direction. Both panels 1, 2 also extend in the Z-direction which is perpendicular to the viewing plane. In this embodiment, the head end 12 of the first panel is angled at a top part. This results in a wedge shaped space to be filled with the second adhesive 5. The first adhesive 4 is used in a lower region between the two panels 1, 2. It is noted that the thickness of the two adhesive layers is deliberately drawn out of proportion, to be able to show more details at the connection region. Due to the wedge shaped gap filled with the second adhesive 5, the second adhesive 5 is thicker at the top side as compared to the side facing the first adhesive 4.

Similar to the embodiment of FIG. 2, the first adhesive 4 in FIG. 4 will give the bond its shear stiffness, while the second adhesive 5 will act as the peel resistant adhesives. The second adhesive 5 strengthens the bond to avoid rotation caused by a force F1. A rotation of the wall panel 2 caused by a force F2 opposite to the force F1, will be limited due to the fact that these forces are absorbed by the second adhesive. Due to the larger thickness of the second adhesive layer 5 as compared to the embodiment of FIG. 2, this absorption is enhanced. It is noted that this advantage will also be achieved when using other cross sectional shapes for the gap, such as rectangular shapes, as long as the thickness of the second adhesive is increased.

A wedge shaped gap has a ratio between 4:10 to 1:10 depending on the modulus of adhesive 5 used, the depth of the gap and the stiffness of second panel 2.

Figure 5:
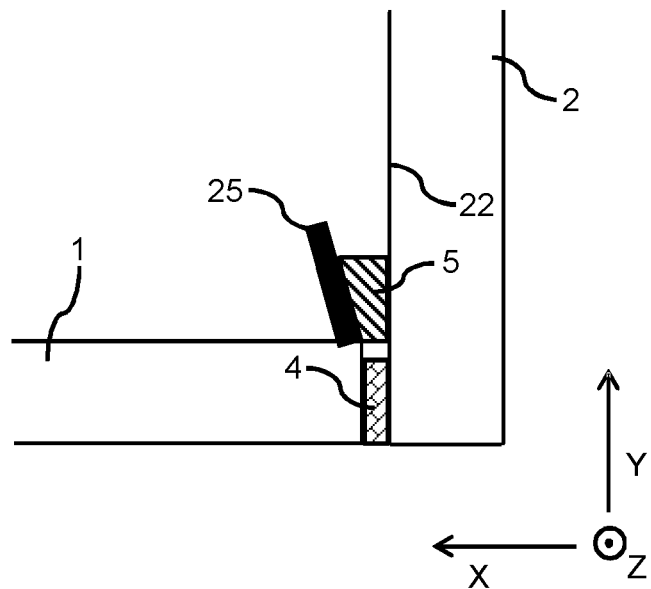
FIG. 5 schematically shows a cross section of an assembly according to another embodiment of the invention.

FIG. 5 schematically shows a cross section of an assembly according to another embodiment of the invention. The assembly comprises a first panel 1 bonded to a second panel 2. A head end 12 of the first panel 1 is connected to a side wall 22 of the second panel 2. In the cross sectional view of FIG. 4 the first panel 1 mainly extends in the X-direction, while the second panel 2 mainly extends in the Y-direction. Both panels 1, 2 also extend in the Z-direction which is perpendicular to the viewing plane. In this embodiment, an extension 25 is arranged on the top surface of the floor panel 1 at the head end side of the first panel. In this particular example, the extension is a straight element arranged on the floor panel 1 at an angle. This results in a wedge shaped space which is filled with the second adhesive 5. The first adhesive 4 is used in a lower region between the two panels 1, 2.

It is noted that the extension 25 can be mounted onto the floor panel 1 with suitable connection means such as bolts and nuts, or screws. Additionally or alternatively, the extension 25 can be bonded to the floor panel 1.

Once properly mounted onto the floor panel 1, the extension may have additional advantages as compared to the embodiment of FIG. 4. Given a certain thickness of the floor panel 1, the extension 25 will effectively increase the contact surface between the floor panel 1 and the wall panel 2. Thus, there will be more space available for applying (i.e. putting) the first adhesive 1. A larger area of the first adhesive 4 will increase the shear stiffness of the connection. Furthermore, the second adhesive 5 is more remote from the bottom of the floor panel 1 as compared to the embodiment of FIG. 4, given an equal thickness of the floor panel 1. As a consequence, an average distance in the Y-direction between the second adhesive 5 and a point of potential rotation of the wall panel 2, is increased. This increased distance will enhance the peel resistance of the second adhesive due to a lower tensile force acting on the adhesives.

A further advantage of the separate extension 25 is that the floor panel 1 can be manufactured with 90 degrees corners, and without the need of angle or rounded corners.

Figure 6:
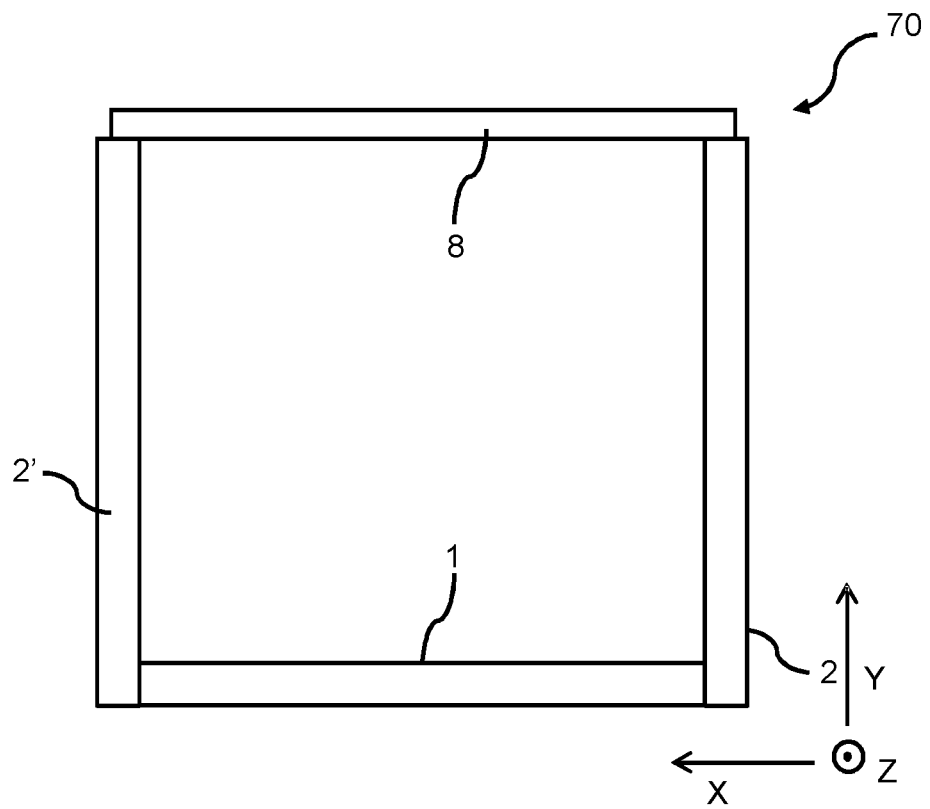
FIG. 6 schematically shows a cross section of a vehicle body comprising a floor panel, two wall panels and a roof panel.

FIG. 6 schematically shows a cross section of a vehicle body 70 comprising a floor panel 1, two wall panels 2, 2' and a roof panel 8. The floor panel 1 may be connected to the wall panels 2, 2' as described in the above mentioned embodiments. The same accounts for the connection of the roof panel 8 and the wall panels 2, 2'. The vehicle body 70 may be a body of a transport bus, wherein the wall panels 2, 2' may comprise one or more windows, not shown in FIG. 6.

Figure 7:
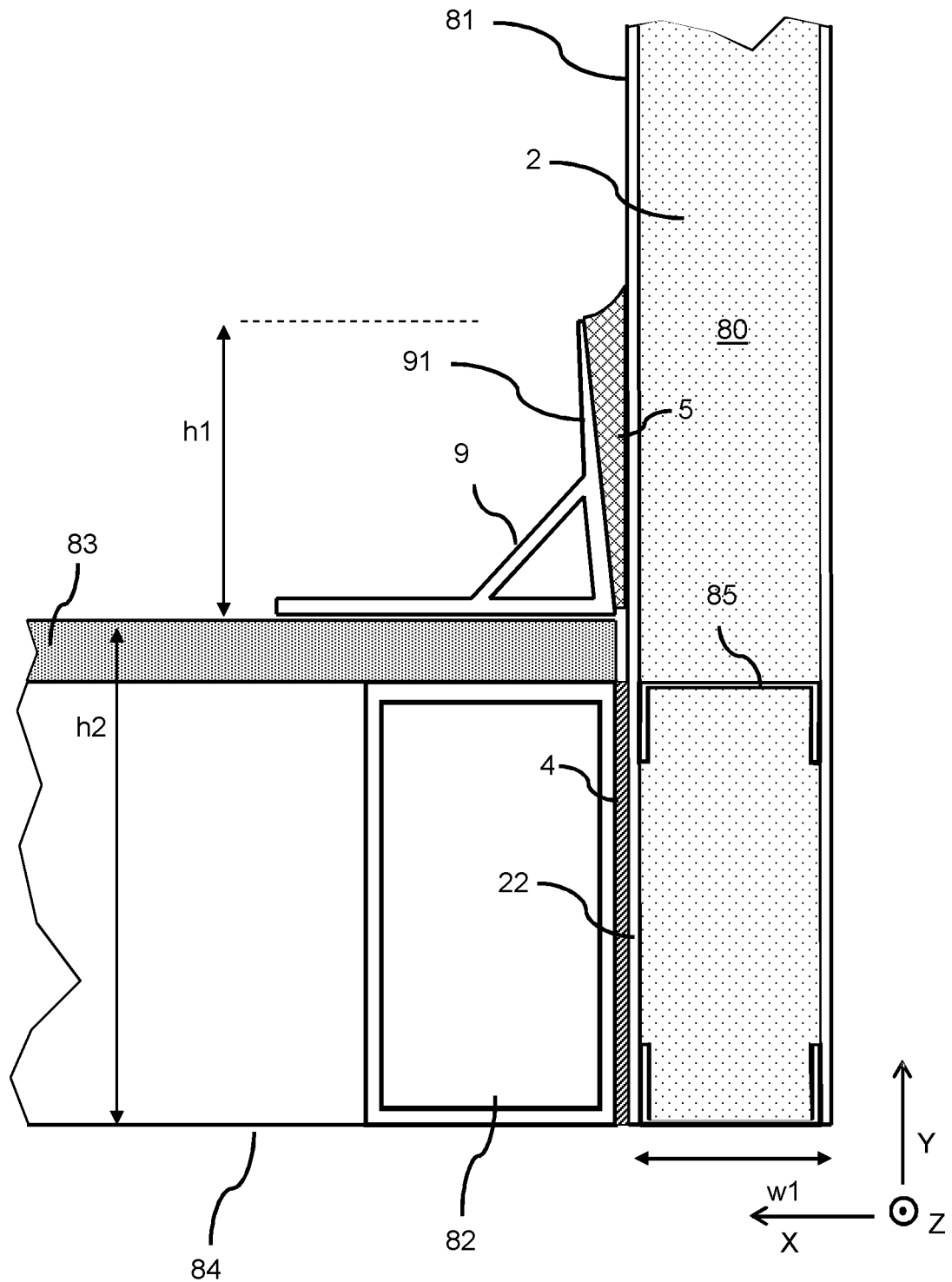
FIG. 7 schematically shows a cross section of a further embodiment of the assembly.

FIG. 7 schematically shows a cross section of a further embodiment of the assembly. The assembly may be part of a vehicle body for a public transport bus. The assembly comprises a floor panel 1 and a wall panel 2. An L-profile 9 is shown which may be used to facilitate production and as a mount for passenger seats in the bus (not shown). In this particular example, the L-profile 9 comprises two legs reinforced with a reinforcement. One of the legs, i.e. leg 91 is slightly angled relative to the vertical (i.e. the Y axis).

In this particular example the partial stiffened L-profile 9 comprises two legs whereby one is slightly angled relative to the vertical (Y-axis).

The floor panel 1 may be a relatively stiff box construction with stiff sides to which the wall panel 2 is bonded. In this example, the floor panel 1 comprises one or more a hollow beams 82 to which a top plate 83 and a bottom plate 84 are connected so as to create a box crate construction.

The wall panel 2 may also have a sandwich construction with a relative lightweight and a weak core 80 so as to minimize the weight of the vehicle body. In the example of FIG. 7, the wall panel 2 comprises a relatively thin skin 81 and one or more enforcements 85. Between the skin 81, a core material such as foam may be arranged.

This sandwich construction of the wall panel 2 has stiff properties in-plane but is relative weak out of plane due to the relatively thin skin 81 and the relatively weak core material. For the bus it is preferred to join the wall panels 2 to the floor panel 1 as rigid as possible especially in plane as a contribution to the overall torsion stiffness of the bus and to resist the vertical loads introduced by the weight and loading of the upper-section of the vehicle body. Hence a stiff adhesive is preferred.

During operation of the bus the side panel 2 is also subjected to forces which act out of plane. During this load case the sandwiched construction of the wall panel 2 shall bend and the interaction towards the floor panel 1 is very localized in the upper part of the joint only. Due to the thin skins 81 the core 80 is then subjected either to flatwise tension or compression in a concentrated line-area.

In a region above the region with the first adhesive 4, a second adhesive 5 is arranged. This second adhesive has a lower elastic modules (λ2) and is thus weaker than the first adhesive 4, but it is able to absorb peel loads.

In the example of FIG. 7, the second adhesive 5 is inserted between the wall panel 2 and the L-profile 9. The L-profile 9 is arranged on top of the floor panel 1 and effectively increases the contact area of the joint towards the wall panel 2. In this way localized forces in the joint can be distributed over a larger area as compared to an assembly without the L-profile 9, and the bending of the wall panel 2 is gradually allowed to take its natural shape.

To further enhance this typical characteristic of the second adhesive 5, the gap between the floor panel 1 and side panel 2 may be widened towards the upper part of the joint. In this embodiment of FIG. 7 this widened gap is introduced by the angled leg 91 of the L-profile 9.

With the construction as shown in FIG. 7 the following interactions will occur during out of plane loading.

When the wall panel 2 is pushed outwards (similar to the force F1 in FIG. 4) the upper section of the joint is stressed in flatwise tension or peel tension over a large area since the deformation (elongation) of the adhesive 4 can be kept constant from the upper section of the wedge shaped joint downwards. To facilitate this behavior, the L-profile 9 can also help when the flange is allowed to slightly deflect as well. In fabricating a wedge shaped section of this flange [?] this design goal is achieved. The stiffer adhesive at the bottom part is now not subjected to any peel or cleavage failure mode.

When the wall panel 2 is pushed inwards the wedge shaped section of the joint is stressed in compression. Again due to the nature and wedge shape of the weaker adhesive 5 this compression load is distributed over a larger area. The wall panel 2 bending deformation is now absorbed by the weaker adhesive 5 and the lower part of the joint shall exert a flatwise tension load to the stiffer adhesive 4. Again the stiffer adhesive 4 within this type of joint is not subjected to any detrimental peel or cleavage failure mode.

In FIG. 7 some typical dimensions are indicated. A height h1 of the L-profile 9 is lying in a range h1=70-100 mm, and a height of the floor panel h2 lies in a range h2=100-160 mm. Typical values for the width w1 of the wall panel 2 are between w1=50-80 mm. An angle α between the Y-axis and the angled leg 91 of the L-profile 9 may lie in a range α=5-20 degrees.

Figure 8:
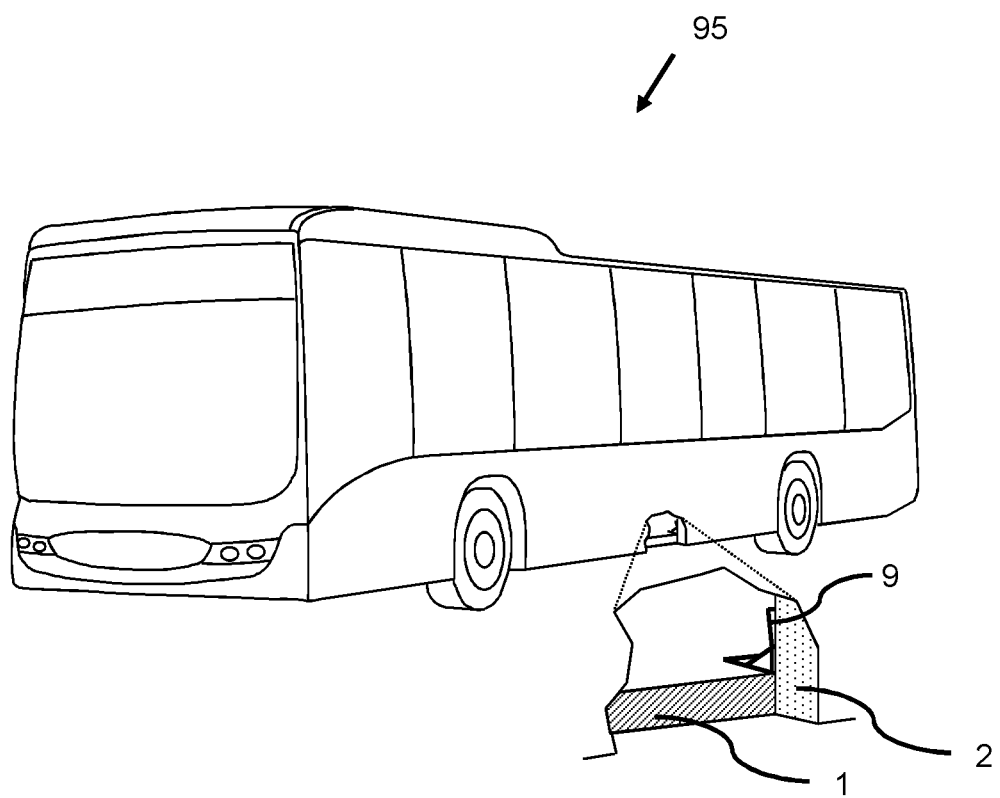
FIG. 8 schematically shows a perspective view of a vehicle body according to an embodiment.

FIG. 8 schematically shows a perspective view of a vehicle body according to an embodiment. In FIG. 8 the entire vehicle body is depicted. In FIG. 8, a cut out is highlighted to show the exact location of the invention. The sidewall 2 is bonded to the floor 1. The L-profile 9 is added to enhance and facilitate the joint strength of this very joint.

Figure 9:
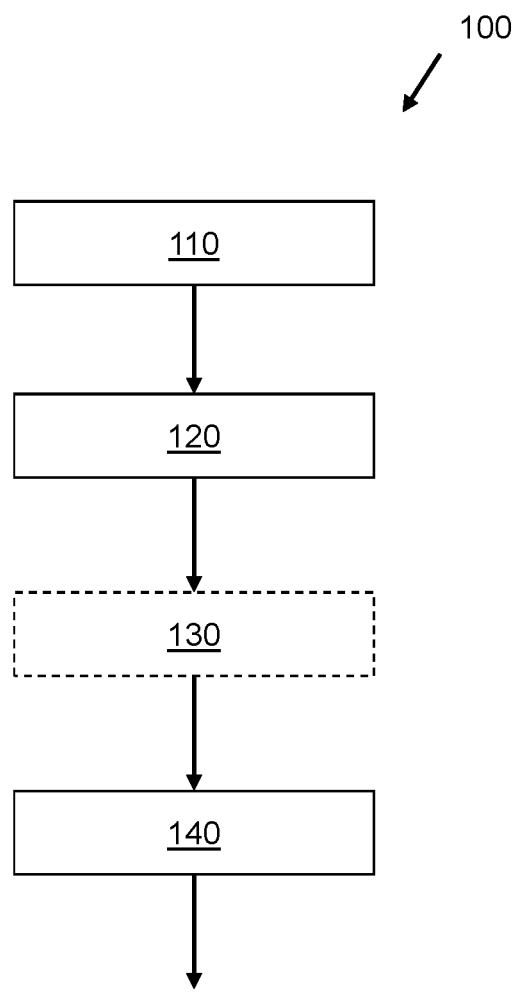
FIG. 9 is a flow chart of a method 100 of manufacturing an assembly comprising a first panel and a second panel according to an embodiment of the invention.

FIG. 9 is a flow chart of a method 100 of manufacturing an assembly comprising a first panel and a second panel according to an embodiment of the invention.

The method starts at a step 110 in which the floor panel 1 is aligned in a mould. Next in a step 120, a wall panel 2 is glued to the outer end of the floor panel 1, using for example an epoxy glue. The wall panel 2 may be held in a vertical position and brought towards the floor panel 1 using a movable mould. Next, in a step 130, the extrusion, such as the L-profile 9, may be mounted onto the floor panel 1, using for example adhesive or blind rivets. Finally, at a step 140, the second adhesive, such as an SMP is inserted/injected in the wedge shape gap between the L-profile 9 and the wall panel 2.

It is noted that a side wall 2 of the vehicle body may comprise multiple wall panels in a row. These wall panels may be connected to each other using adhesive or other connection means. Alternatively, the side wall 2 may be formed by a single panel. Furthermore, the wall panels may be part of an integrated part comprising two wall panels and an intermediate roof panel.

In an embodiment, the first adhesive 4 comprises a two-component epoxy, and the second adhesive comprises a silyl-modified polymer. Other types of adhesives may be used. The floor panel 1 may be manufactured using carbon fibers in an epoxy matrix. The skins 81 of the wall panels 2 may be manufactured using glass fibers and a vinylester resin. The L-profile 9 may be manufactured using e.g. an aluminium extrusion.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An assembly comprised of:
   a first panel having a head end surface and a second panel having a side surface, wherein
   the head end surface of the first panel is connected to the side surface of the second panel such that the assembly has an L-shape or T-shape when seen in a cross sectional view, and wherein
   the first and second panels are bonded together by at least a first adhesive having a first elastic modulus and a second adhesive having a second elastic modulus that is lower than the first elastic modulus, wherein
   the first adhesive bonds the panels in a first region, and the second adhesive bonds the panels in a second region, the second region being arranged next to the first region when seen in the cross sectional view.

2. The assembly according to claim 1, wherein the first and second panels form an L-shaped joint, and wherein the second adhesive seals the first adhesive from an enclosed space that is bounded by the first and second panels.

3. The assembly according to claim 1, wherein the first panel is a floor panel of a vehicle, and the second panel is a wall panel of the vehicle.

4. The assembly according to claim 1, wherein the first panel and the second panel are shaped so as to create a region having a wedge shape in the cross-sectional view which is at least partly filled with the second adhesive.

5. The assembly according to claim 1, wherein the assembly comprises an extension arranged on the first panel to effectively increase the head end surface of the first panel, and wherein the second adhesive is arranged between the extension and the side surface of the second panel.

6. The assembly according to claim 5, wherein the extension comprises an L-profile coupled to the first panel at a side surface of the first panel near the head end.

7. The assembly according to claim 6, wherein the extension comprises metal with a stiffness between 70000 MPa and 210000 MPa.

8. The assembly according to claim 1, wherein the first elastic modulus is in a range between 500-2000 MPa.

9. The assembly according to claim 1, wherein the second elastic modulus is in a range between 5-20 MPa.

10. The assembly according to claim 1, wherein the first adhesive comprises a two-component epoxy.

11. The assembly according to claim 1, wherein the second adhesive comprises a silyl-modified polymer or polyurethane polymer.

12. A vehicle body comprising the assembly according to claim 1.

13. The vehicle body according to claim 12, wherein the vehicle body is a body for a high occupancy vehicle.

14. The vehicle body according to claim 13, wherein the vehicle body is a body for a public transport bus.

15. A method of connecting a first panel and a second panel to provide the assembly according to claim 1, the method comprising:
   (i) providing at least part of the head end surface of the first panel with the first adhesive having the first elastic modulus;
   (ii) placing the head end surface of the first panel onto the side surface of the second panel; and (iii) inserting the second adhesive having the second elastic modulus between the head end surface of the first panel and the side surface of the second panel.

\* \* \* \* \*